United States Patent [19]

Fermann et al.

[11] Patent Number: 5,479,422
[45] Date of Patent: Dec. 26, 1995

[54] CONTROLLABEL DUAL-WAVELENGTH OPERATION OF MODELOCKED LASERS

[75] Inventors: Martin E. Fermann, Ann Arbor; Gregg Sucha, Manchester; Donald J. Harter, Ann Arbor, all of Mich.

[73] Assignee: Imra America, Inc., Ann Arbor, Mich.

[21] Appl. No.: 289,216

[22] Filed: Aug. 12, 1994

[51] Int. Cl.$^6$ ................................................ H01S 3/098
[52] U.S. Cl. .................................... 372/18; 372/23
[58] Field of Search .................... 372/18, 23, 93, 372/97

[56] References Cited

U.S. PATENT DOCUMENTS

| | | | |
|---|---|---|---|
| 3,869,680 | 3/1975 | Fletcher et al. | 372/18 |
| 4,268,801 | 5/1981 | Stappaerts | 372/18 |
| 4,685,111 | 8/1987 | Baer | 372/18 |
| 4,764,929 | 8/1988 | Thaniyavarn | 372/18 |
| 4,773,073 | 9/1988 | Warner et al. | 372/18 |
| 4,930,133 | 5/1990 | Babbitt et al. | 372/18 |

OTHER PUBLICATIONS

M. R. X. de Barros and P. C. Becker, "Two–color Synchronously Mode–Locked Femtosecond Ti:sapphire Laser", Optics Letters, Apr. 15, 1993, vol.18, No. 8 pp. 631–633.
D. R. Dykaar and S. B. Darack, "Sticky Pulses: Two color Cross–mode–Locked Femtosecond Operation of a Single Ti:sapphire Laser", Optics Letters, Apr. 15, 1993, vol. 18, No. 8 pp. 634–636.
M. L. Dennis and I. N. Duling III, "Intracavity Dispersion Measurement in Modelocking Fibre Laser", Electronics Letters, vol. 29, 409 (1993). No month.
J. D. Kafka, J. W. Pieterse and M. L. Watts, "Two–Color Optical Sampling Technique", Optics Letters, Sep. 15, 1992, vol. 17, No. 18, pp. 1286–1288.
J. M. Evans, D. E. Spence, D. Burns and W. Sibbett, "Dual14 Wavelength Self–mode–Locked Ti:sapphire Laser", Optics Letters, Jul. 1, 1993, vol. 18, No. 13, pp. 1074–1076.
M. Hofer, M. E. Fermann, F. Habert, M. H. Ober and A. J. Schmidt, "Model Locking With Cross–phase and Self–phase Modulation", Optics Letters, Apr. 1, 1991, vol. 16, No. 7, pp. 502–504.
M. H. Ober, M. Hofer, U. Keller and T. H. Chiu, "Self–starting Diode–pumped Femtosecond Nd Fiber Laser", Optics Letters, Sep. 15, 1993, vol. 18, No. 18, pp. 1532–1534.
M. H. Ober, M. Hofer and M. E. Fermann, "42–fs Pulse Generation from a Model–Locked Fiber Laser Started with a Moving Mirror", Optics Letters, Mar. 1, 1993, vol. 18, No. 5, pp. 367–369.
A. Mecozzi, J. D. Moores, H. A. Haus and Y. Lai, "Solution Transmission Control", Optics Letters, Dec. 1, 1991, vol. 16, No. 23, pp. 1841–1843.

*Primary Examiner*—Rodney B. Bovernick
*Assistant Examiner*—Robert E. Wise
*Attorney, Agent, or Firm*—Sughrue, Mion, Zinn, Macpeak & Seas

[57] ABSTRACT

A laser system that enables dual-wavelength asynchronous modelocked operation with controllable repetition rates reduces gain competition and wavelength coupling with either inhomogeneously or homogeneously broadened gain media. Another purpose of the laser system is to minimize pulse interaction effects. The system includes a laser excitation device for generating output wavelengths from the gain medium with non-uniform gain profile. Further, the system includes devices for modelocking and coupling the wavelengths generated by the gain medium. The system includes at least one laser cavity for each of the generated wavelengths.

20 Claims, 4 Drawing Sheets

CONTROLLABEL DUAL-WAVELENGTH OPERATION OF MODELOCKED LASERS

BACKGROUND OF THE INVENTION

1. Field of the Invention

The present invention relates to a laser system which allows asynchronous modelocking of two wavelengths in a single gain medium with mutually controllable repetition rates.

2. Description of the Related Art

In general, work in the field of dual-wavelength operation of modelocked solid-state lasers has centered on laser systems based on either bulk Ti:sapphire lasers or erbium fiber lasers. Such laser systems are attractive since they can be used in nonlinear optical mixing techniques or laser sensor systems. Particularly when the lasers operate asynchronously they can be used to make pump probe measurements.

However, a problem common to both Ti:sapphire and erbium is that they are homogeneously broadened. As a result, there is gain-competition between the two wavelengths, therefore requiring an exact balancing of the cavity losses to prevent the domination of one wavelength. Specifically, in Ti:sapphire the coupling between the two wavelengths is so strong that asynchronous operation of the two wavelengths in a single gain medium is not possible.

For example, M. R. X. de Barros and P. C. Becker, in Opt. Lett., 18, 631 (1993) describe the simultaneous generation of two collinear synchronous modelocked pulse trains, with wavelength separation of 60 to 80 nm, from a single cavity modelocked Ti:sapphire laser. In this laser, pulse synchronization is caused by the modelocking process being stronger with spatial and temporal overlap between the two pulses in the Ti:sapphire crystal. The temporal overlap provides for coupling between the two colors, which promotes the locking of the two pulses in synchronous mode. If the pulses do not overlap, e.g., if the two cavity lengths are not equal, there is competition between the two colors and one of them will be extinguished. Thus, stable operation of the laser in a dual wavelength mode is not achievable.

In addition, D. R. Dykaar and S. B. Darack, in Opt. Lett., 18, 634 (1993) describe the generation of dual-wavelength femtosecond pulses in a single cavity modelocked Ti:sapphire laser through the use of modified end mirrors to produce a second beam. Synchronization of the pulses is maintained by crossing the beams of the argon pump lasers and matching the cavity lengths of each wavelength. However, since the beams do not overlap, they can be allowed to operate asynchronously. By using the same pump laser and crystal, jitter between the two pulses can be minimized.

However, neither of the above described references produces dual-wavelength operation in asynchronous mode. As discussed above, such asynchronous operation is difficult to achieve in homogeneous gain media.

In addition, the use of a single gain medium would be greatly preferred so as to obtain the lowest possible phase noise between the two emission wavelengths. However, this is possible only when the wavelengths are weakly coupled. Even though modelocked erbium fiber lasers operate asynchronously, current erbium fiber lasers do not allow for an accurate wavelength selection anywhere in the cavity, which prevents control over the two-wavelength operation state.

SUMMARY OF THE INVENTION

The present invention has been designed to achieve controllable dual-wavelength operation of modelocked lasers. In the present invention, the use of a single gain medium yields the lowest possible phase noise between the two emission wavelengths, while weak coupling between the wavelengths ensures a robust system. Specifically, it is an object of the invention to eliminate the disadvantages of known dual-wavelength modelocked lasers by reducing gain competition and wavelength coupling. By reducing gain competition and a modelocking mechanism which promotes synchronous operation, the exact balancing of the cavity losses is not necessary to prevent the domination of one wavelength.

According to an embodiment of the present invention, a controllable dual-wavelength modelocked laser system comprises an inhomogeneously broadened laser gain medium (i.e., a laser gain medium with a homogeneous line width smaller than the wavelength separation of the output), a sequence of prisms to yield dispersion compensation and wavelength separation, a Kr-ion laser or laser diodes as a laser excitation means, and two output couplers and a knife edge to further separate the generated wavelengths.

DETAILED DESCRIPTION OF THE PREFERRED EMBODIMENTS

Figure 1:
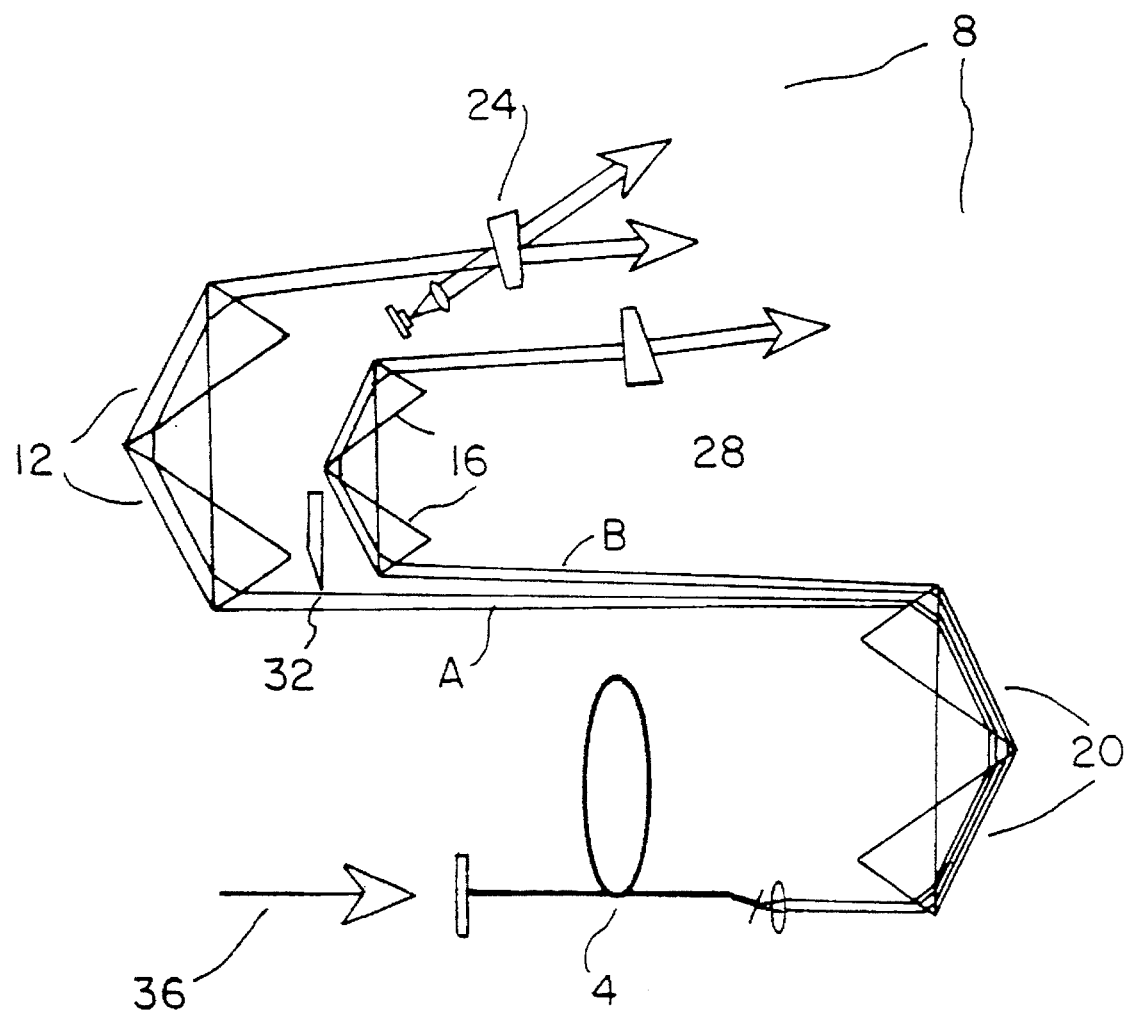
FIG. 1 shows one embodiment of a controllable dual-wavelength modelocked laser system.

As shown in FIG. 1, a first embodiment of the present invention comprises a weakly linearly birefringent silica fiber 4 (NA=0.17, core diameter=5 m) as the single gain medium. To alleviate the effects of gain competition by providing an inhomogeneously broadened gain medium, the fiber is doped with $Nd^{3+}$ to a level of approximately 1700 ppm. $Nd^{3+}$ doped silica fiber stands out, as far as is known to the present inventors at the present time, as regards its inhomogeneously broadened characteristic at room temperature. As an additional benefit of the use of Nd doping, the shorter emission wavelengths of the resulting gain medium (as compared to that of Er fiber lasers) allows highly dispersive prisms (discussed in detail below) to be used within cavity 8 for dispersion-compensation and efficient separation of the two emission wavelengths.

In the illustrated embodiment, the fiber/gain medium has an active length of 20 cm. With suitable optical pumping (discussed below), the Nd doped fiber laser produces approximately bandwidth-limited femtosecond-order pulses at wavelengths of 1060 and 1100 nm, which will herein for convenience be referred to as the "blue" line (wavelength) and the "red" line (wavelength), respectively. In the laser as illustrated, the second order dispersion $\beta_2$ is about 27.5 and 25.9 $psec^2/km$ at the blue wavelength and the red wavelength respectively. Hence, the corresponding group-velocity walk-off is 15 fsec per cm fiber length.

Dispersion compensation is achieved by using two sequences of three SF 10 prisms 12, 16, 20. The two prism sequences 12, 16 closest to the two output couplers 24, 28 and knife edge 32 are arranged to yield the desired wavelength separation. The effective prism apex separation is 73 cm for the blue line A and 60 cm for the red line B.

The fiber 4 is pumped with a Kr-ion laser 36 at wavelengths of 752 and 799 nm with a launched pump power of 350 mW. Alternatively, the pump laser can be substituted for by laser diodes having appropriate operating wavelengths around 800 nm. The two output couplers 24, 28 have a transmission factor of 10% and 16% at the blue and red wavelengths respectively. The respective cw output powers are 15 and 10 mW.

To achieve modelocking, the nonlinear polarization evolution (NPE) technique is used for the red line, while saturable absorber modelocking is applied for the blue line. Start-up of modelocking for the red line is achieved by using a moving mirror technique, whereas for the blue line the slow component of the saturable absorber initiates the modelocking process. The foregoing modelocking techniques are described in detail in M. H. Ober, M. Hofer, U. Keller and T. H. Chiu, Opt. Lett., 18, 1533 (1993), M. H. Ober, M. Hofer and M. E. Fermann, Opt. Lett., 18, 367 (1993) and A. Mecozzi, J. D. Moores, H. A. Haus and Y. Lai, Opt. Lett, 16, 1841 (1991), respectively, the disclosures of which are hereby incorporated herein by reference.

The modelocked output powers are 4 mW (red) and 3.5 mW (blue). The blue cavity has a repetition rate of 67.25 Mhz. The red cavity has a repetition rate which is adjustable about this central frequency by mounting the end mirror on a translation stage (not shown).

Figure 2A:
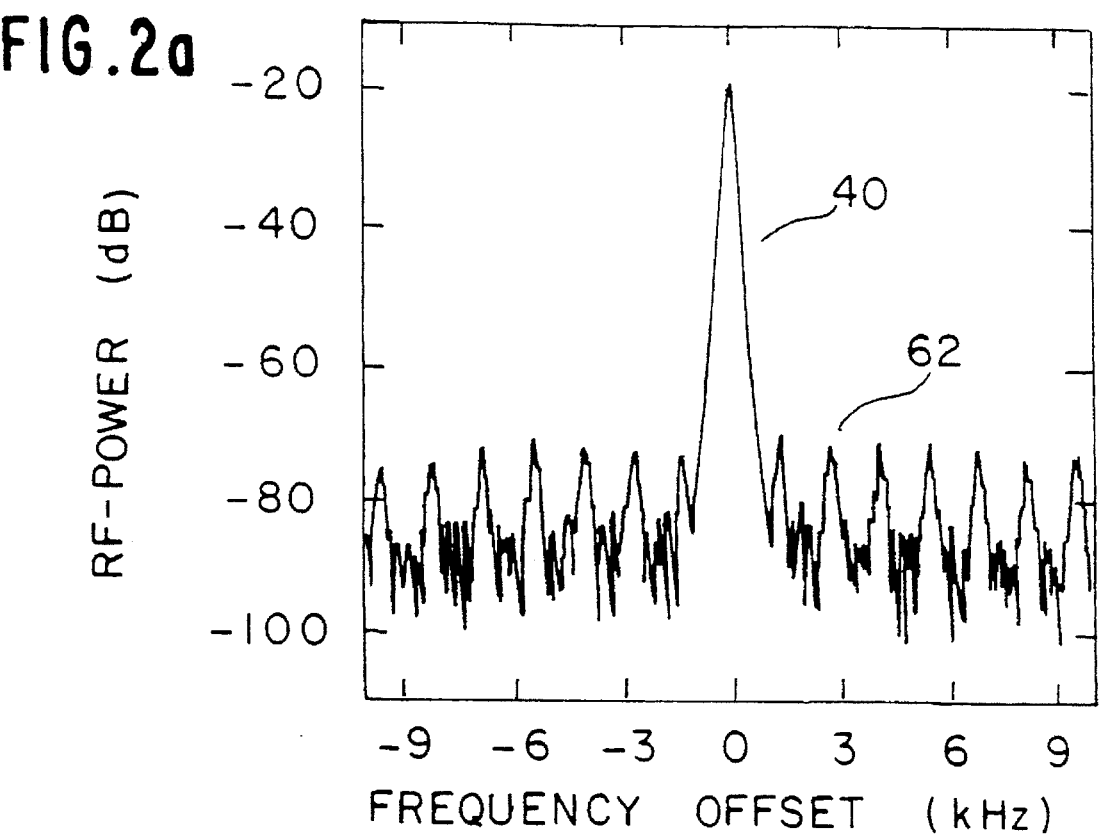
FIGS. 2A and 2B show the radio frequency (RF) spectra of one embodiment when the laser system operates a synchronously.
Figure 2B:
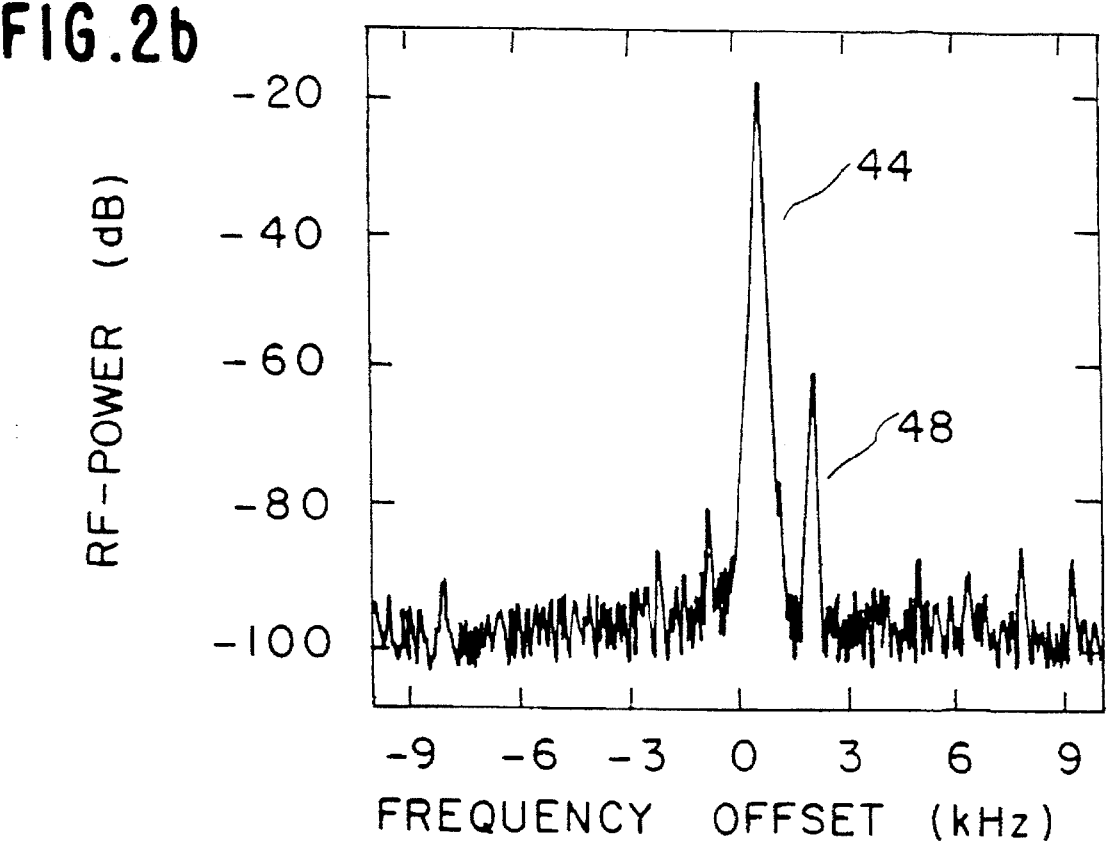

FIG. 2 shows the radio frequency (RF) spectra of the system of the first embodiment when the laser system operates asynchronously. FIG. 2(a) shows the RF spectrum for the blue wavelength output 40. FIG. 2(b) show the RF spectrum for the red wavelength output 44. As can be seen from these figures, the two pulse trains are almost completely independent, with little or no apparent sidebands. The strong feature 48 visible in the red output arises from a modulation of a residual cw background on the red pulse spectrum 52 (shown in FIG. 3(b)) through cross-phase modulation and gain saturation. This feature is also present when modelocking only the blue line and operating the red line cw. A similar modulation is also present on the cw output of the blue line when only the red line is modelocked. However, as no cw background is present on the blue pulse train, the cw modulation sideband disappears once the blue line is modelocked.

Figures 3A, 3B, 3C, 3D:
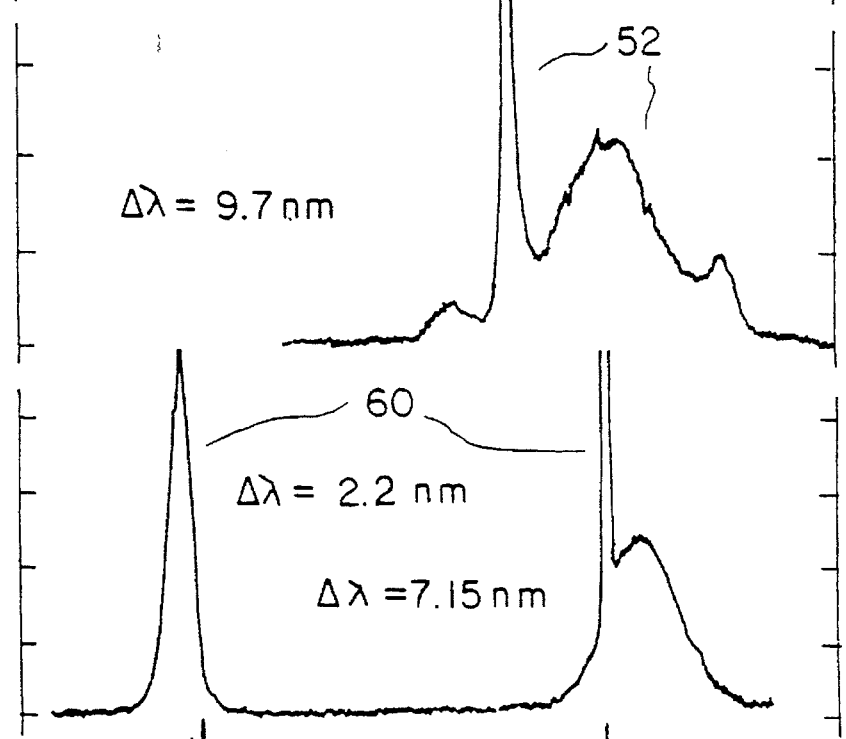
FIGS. 3A to 3D show the pulse spectra of the wavelengths of one embodiment of the system.

The above spectral features can in part be seen from FIGS. 3(a)-(d), which illustrate the output spectra from the dual-wavelength laser. Here, FIG. 3(a) shows the blue pulse spectrum 56 with the laser operating in single line fashion. FIG. 3(b) illustrates the spectra obtained from single line operation at the red wavelength only. FIG. 3(c) shows the dual-wavelength pulse spectrum 60, with both the red and blue lines modelocked, whereas FIG. 3(d) shows the same emission spectrum with both lines running cw.

A minimum difference frequency of 500 Hz must be provided between the two output pulses to obtain dual-wavelength operation. No simultaneous modelocking is possible when the cavity lengths are matched. At a difference frequency of 500 Hz, the pulses walk away from each other by 100 fsec per round trip, which thus limits the number of successive pulse collisions to 2 (for pulse widths of 200 fsec). Since the walk-through time of the pulses can be much longer than the relaxation oscillation period, gain saturation effects lead only to weak pulse interactions, as desired. On the other hand since the number of possible pulse collisions is strictly limited, cross-phase modulation is dominantly responsible for terminating the dual-wavelength operation state once the difference frequency becomes too small. The effect of pulse collisions is reduced by group-velocity walk-off inside the gain medium.

Saturable absorption is the weaker modelocking mechanism since it produces less amplitude modulation. When saturable absorption is used, pulse interactions play a more significant role in the pulse formation process. This notion is further supported by the RF spectra (FIG. 2), where the sidebands 62 are also stronger for the saturable absorber-modelocked line. Thus, a system employing a Kerr-nonlinearity for both wavelengths (using a special fiber design) is ideal and minimizes amplitude instabilities (as observed in Er fiber lasers, see, e.g., M. L. Dennis and I N. Duling III, Electron, Lett., 29, 409 (1993)). A cw component may arise from residual leakage between the two cavities or may arise fundamentally since the red line is shifted by a large amount from the peak of the neodymium gain profile.

An alternative embodiment of the invention utilizes laser material in which a degree of inhomogeneous broadening may be achieved by cooling the medium to a specific temperature lower than room temperature. For example, Erbium glass becomes an inhomogenously broadened gain medium by cooling to liquid nitrogen temperatures.

Figure 4:
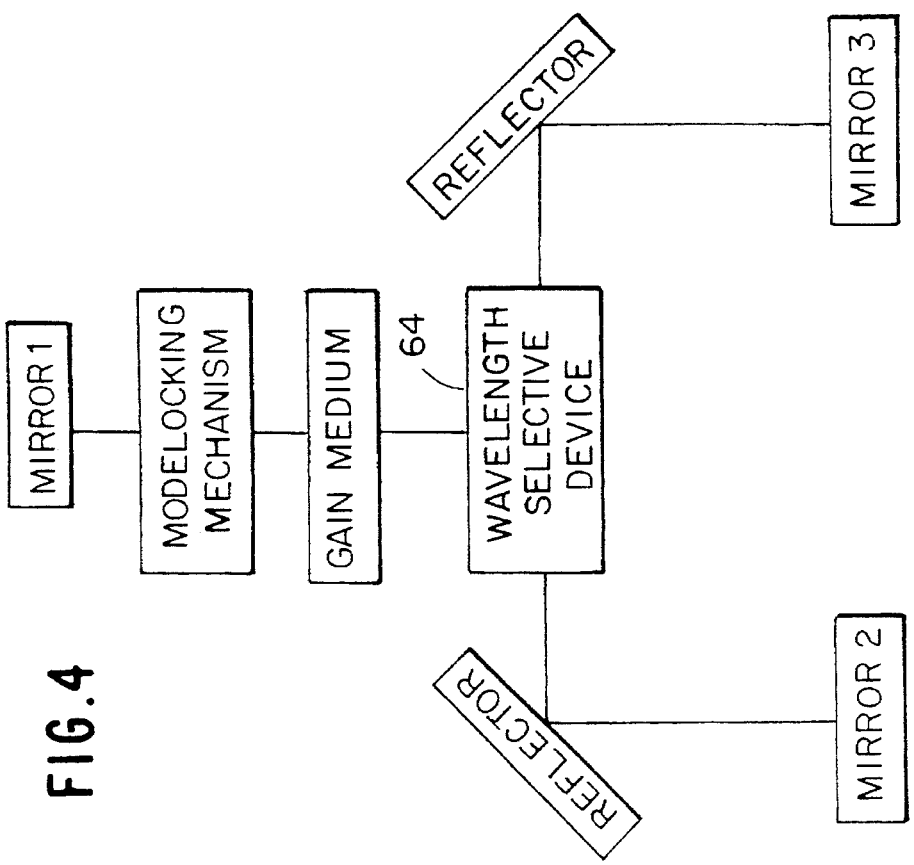
FIG. 4 shows one embodiment of a dual-wavelength laser cavity with incorporated wavelength filter.

In another embodiment of the present invention, a birefringence medium is inserted into the cavity to allow Kerr-type modelocking for both wavelengths. In conjunction with polarization elements in the cavity, two transmission peaks can be achieved within the gain spectrum of the laser medium. Other wavelength selective elements such as gratings Lyot filters etalons and dichroic mirrors could be used to perform such functions. A resulting generic dual-wavelength laser cavity with an incorporated wavelength filter 64 is shown in FIG. 4.

Figure 5:
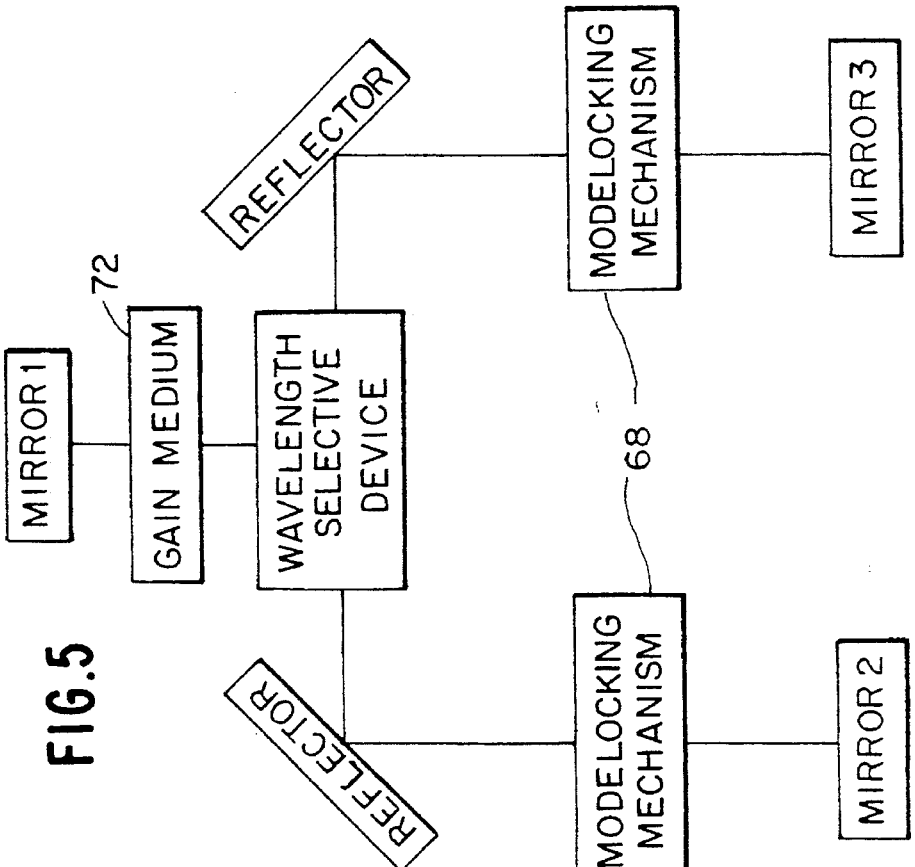
FIG. 5 shows one embodiment in which active modelocking is adapted to asynchronous dual-wavelength operation by inserting optical modulators in front of output couplers.

In another arrangement of the present invention, active modelocking is adapted to asynchronous dual-wavelength operation by inserting optical modulators in front of output couplers 24 28. A controllable repetition rate is then obtained by matching the modulation periods of the two modulators for the two wavelengths to the respective cavity lengths. An example of such a cavity design is shown in FIG. 5. In general the modelocking mechanism 68 can be separated from the gain medium 72. Further, the gain medium can be sufficiently short so that nonlinearities in the gain medium can be neglected; modelocking is achieved in entirely separate components of the laser cavity. With the modelocking mechanism independent and not favoring synchronous operation, non-synchronous operation even with homogeneous media is possible as long as the gain competition is not too strong (lifetime long compared to cavity roundtrip time (approx. 1 μsec)). Asynchronous operation of a dual wavelength laser of this type is promoted if, in combination with a wavelength selection process such that the cavity lengths can be independently controlled, the pulses produced by the laser are soliton-like, such that a pulse overlap creates only a phase delay rather than a distortion in the pulses of the two different wavelengths. In Ti:sapphire, for example, the pulses are not truly soliton-like according to this definition. However, in fiber lasers in general, and with Erbium doped fiber laser pulses in particular, soliton-like behavior has been exhibited such that the pulses pass through each other without interference.

It should be noted that the above embodiments serve only as examples of the disclosed invention. The scope of the present invention should be determined by the claims set forth below.

What is claimed:

1. A laser system, comprising:
   i. generation means having a single gain medium, for generating light outputs having at least a first wavelength and a second wavelength;
   ii. first modelocking means for modelocking said first wavelength;
   iii. second modelocking means for modelocking said second wavelength;
   iv. output coupling means for coupling said first wavelength and said second wavelength to respective outputs;
   v. laser excitation means for exciting said gain medium; and
   vi. at least one laser cavity for said first wavelength and said second wavelength.

2. A laser system according to claim 1, further comprising wavelength selective elements wherein said elements feed said first wavelength along a first path and said second wavelength along a second path different from said first path.

3. A laser system according to claim 1, wherein said gain medium has a relaxation time greater than 1 μsec.

4. A laser system according to claim 1, wherein said first and said second modelocking means use Kerr-type modelocking.

5. A laser system according to claim 1, wherein said gain medium has a group velocity walk off between pulses of greater than one pulse width.

6. A laser system according to claim 1, wherein said first modelocking means uses a different modelocking mechanism than from said second modelocking means.

7. A laser system according to claim 1, wherein said first modelocking means is positioned in a laser cavity at a location separated from said second modelocking means.

8. A laser system according to claim 1, wherein said gain medium is positioned at a location common to two of said laser cavities.

9. A laser system according to claim 1, further comprising a wavelength separation means for feeding said first wavelength along a first path and said second wavelength along a second path different from said first path.

10. A laser system according to claim 1, wherein said laser cavity has at least one end mirror mounted on a translation stage.

11. A laser system according to claim 1, wherein asynchronous dual-wavelength operation optical modulators are inserted in front of said output couplers.

12. A laser system according to claim 1, wherein said gain medium is inhomogeneously broadened and comprises an Nd doped silica fiber.

13. A laser system according to claim 1, wherein said gain medium is inhomogeneously broadened and comprises an erbium doped fiber cooled to a temperature below room temperature.

14. A laser system according to claim 13, wherein said second modelocking means comprises a Kerr type nonlinearity.

15. A laser system according to claim 1, wherein said first modelocking means comprises a saturable absorber.

16. A laser system comprising:
   i. a generation means having an inhomogeneously broadened, single gain medium, for generating light outputs at at least a first wavelength and a second wavelength wherein said gain medium has a relaxation time greater than 1 μsec;
   ii. first active or passive modelocking means for modelocking said first wavelength;
   iii. second active or passive modelocking means for modelocking said second wavelength;
   iv. output coupling means for coupling said first wavelength and said second wavelength to respective outputs;
   v. laser excitation means for exciting said gain medium;
   vi. at least one laser cavity for said first wavelength and said second wavelength; and
   vii. wavelength selective elements, wherein said elements feed said first wavelength along a first path and said second wavelength along a second path different from said first path.

17. A laser system as claimed in claim 16, wherein said wavelength selective elements comprise optical devices including at least one of prisms, gratings, Lyot filters, etalons and dichroic mirrors.

18. A laser system, comprising:
   i. a generation means having an inhomogeneously broadened, single gain medium, for generating light outputs at at least a first wavelength and a second wavelength, wherein said gain medium has a group velocity walk off between pulses approximately equal to or greater than one pulse width;
   ii. first modelocking means for modelocking said first wavelength;
   iii. second modelocking means for modelocking said second wavelength, wherein said first modelocking means is positioned at a location separated from said second modelocking means;
   iv. output coupling means for coupling said first wavelength and said second wavelength to respective outputs;
   v. laser excitation means for exciting said gain medium;
   vi. at least one laser cavity for each of said first wavelength and said second wavelength, wherein said gain medium is positioned in a location common to said laser cavities; and vii. wavelength selective elements, wherein said elements feed said first wavelength along a first path and said second wavelength along a second path different from said first path.

19. A laser system, comprising:

i. a generation means in the form of a gain medium which generates soliton-like pulse outputs at at least a first wavelength and a second wavelength;

ii. first modelocking means for modelocking said first wavelength;

iii. second modelocking means for modelocking said second wavelength, wherein said first modelocking means is positioned at a location separated from said second modelocking means and said gain medium;

iv. output coupling means for coupling said first wavelength and said second wavelength to respective outputs;

v. laser excitation means for exciting said gain medium;

vi. at least one laser cavity for each of said first wavelength and said second wavelength, wherein said gain medium is positioned in a location common to said laser cavities; and vii. wavelength selective elements, wherein said elements feed said first wavelength along a first path and said second wavelength along a second path different from said first path.

20. A laser system according to claim 19, wherein said gain medium has a relaxation time greater than 1 μsec.

* * * * *

UNITED STATES PATENT AND TRADEMARK OFFICE
CERTIFICATE OF CORRECTION

PATENT NO. : 5,479,422
DATED : December 26, 1995
INVENTOR(S) : Martin E. Fermann, et al It is certified that error(s) appears in the above-identified patent and that said Letters Patent is hereby corrected as shown below:

On title page,
    item [73], IMRA AMERICA should be in capital letters and not "Imra America".

Signed and Sealed this

Twenty-first Day of May, 1996

*Attest:*

BRUCE LEHMAN

*Attesting Officer*     *Commissioner of Patents and Trademarks*